United States Patent [19]

Korzenecki

[11] Patent Number: 4,665,861
[45] Date of Patent: May 19, 1987

[54] FLOW THROUGH APPARATUS FOR MANUFACTURING BATTERY PLATES

[75] Inventor: Paul Korzenecki, Benton Harbor, Mich.

[73] Assignee: Mac Engineering and Equipment Company, Inc., Benton Harbor, Mich.

[21] Appl. No.: 674,513

[22] Filed: Nov. 23, 1984

Related U.S. Application Data

[63] Continuation-in-part of Ser. No. 606,232, May 2, 1984, abandoned.

[51] Int. Cl.⁴ .................. B05C 11/00; B05C 13/02; B65G 37/00; B65G 43/08
[52] U.S. Cl. .................................. 118/668; 118/38; 118/58; 198/369; 198/460; 198/572
[58] Field of Search .................. 118/38, 668, 687, 58, 118/236; 198/460, 572, 369

[56] References Cited

U.S. PATENT DOCUMENTS 3,990,388 11/1976 Kirchberger et al. ............ 118/58 X
4,197,935 4/1980 Aterianus et al. ................ 198/460
4,424,966 1/1984 Chandhoke .................... 198/369 X Primary Examiner—Evan K. Lawrence
Attorney, Agent, or Firm—Michael, Best & Friedrich

[57] ABSTRACT

Apparatus for manufacturing battery plates includes a mechanism for transferring battery plate panels between conveyors comprising a supply conveyor having a discharge end, a receiving conveyor having a receiving end located adjacent to and below the discharge end of the supply conveyor and including an endless member movable along a predetermined path and having thereon a battery plate drive lug adapted to engage a battery plate panel and thereby to cause transport of the battery plate panel along the receiving conveyor, and a drive for periodically advancing the endless member in the direction of conveyor advance and through a predetermined distance greater than the length of a battery plate panel, guides stationarily located adjacent the discharge end of the supply conveyor for guiding battery plate panel travel from the supply conveyor to the receiving conveyor, another drive for advancing the supply conveyor so as to deliver battery plate panels onto the guides for delivery to the receiving conveyor, and a sensor located in the area of battery plate receipt on the receiving conveyor for sensing the receipt of a battery plate panel on the receiving conveyor and, in response, actuating the endless member advancing drive to advance the endless member through the predetermined distance. The transferring mechanism may be used to prevent transfer of baked battery panels from an oven to a parting machine which severs the panels into battery plates.

11 Claims, 10 Drawing Figures

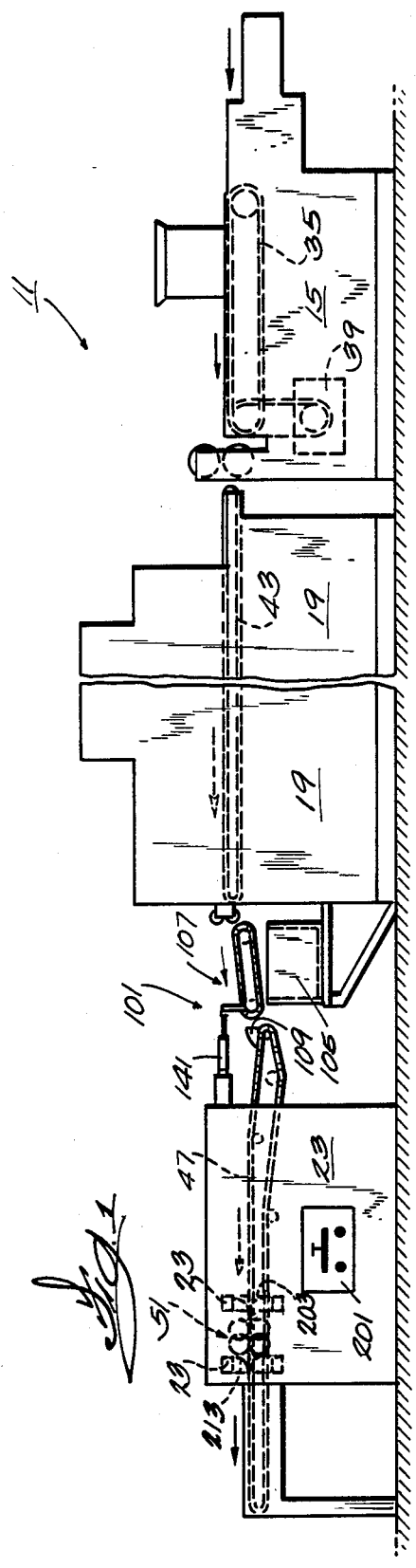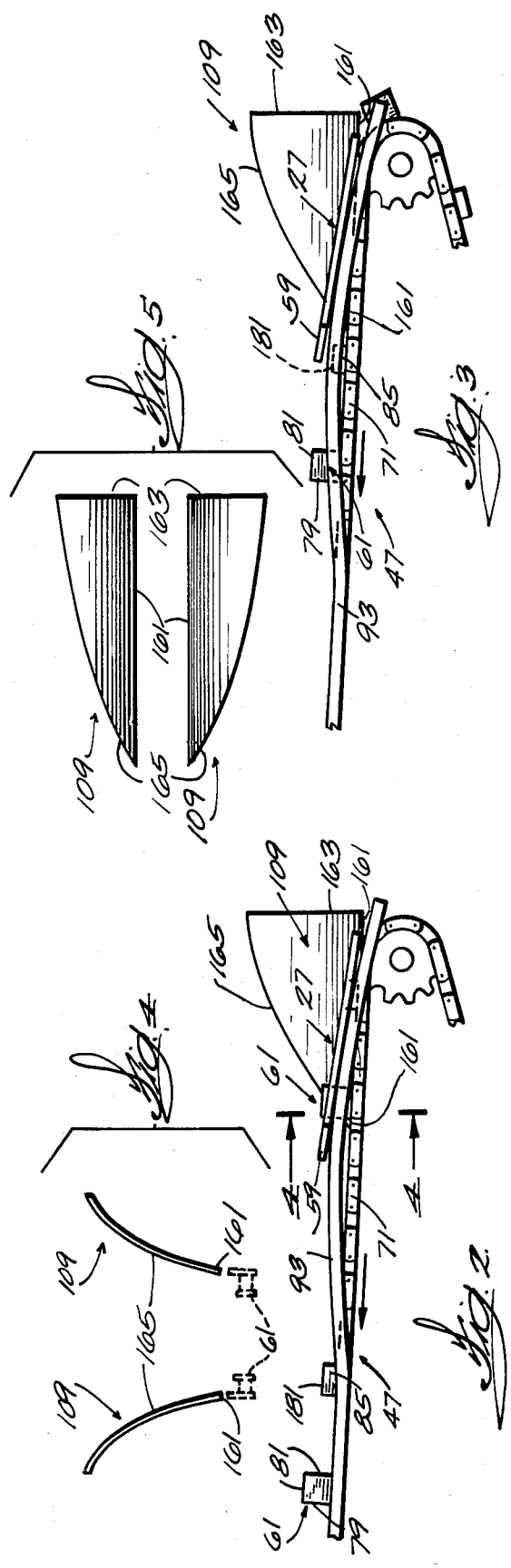

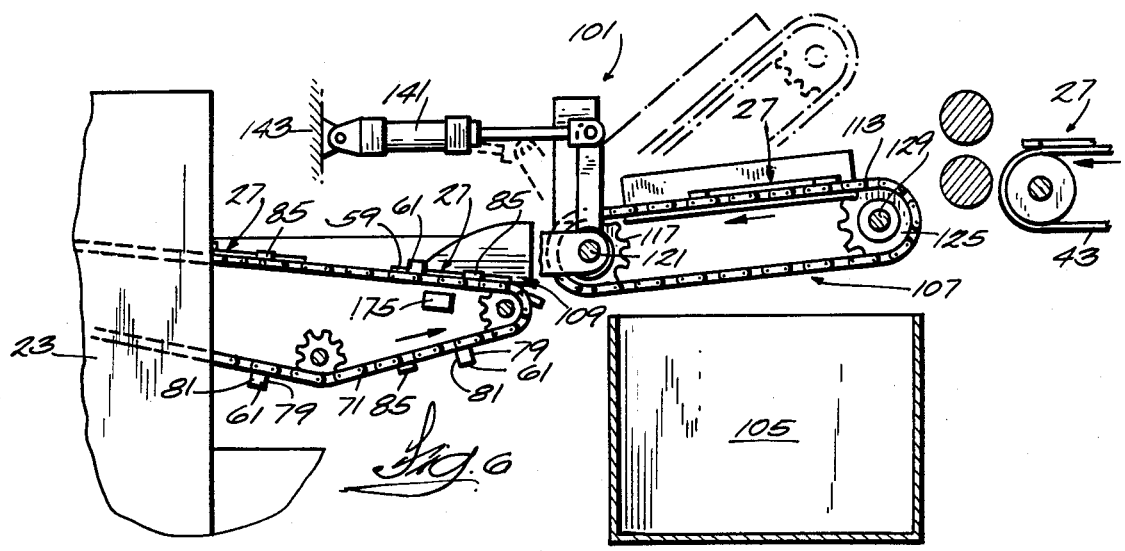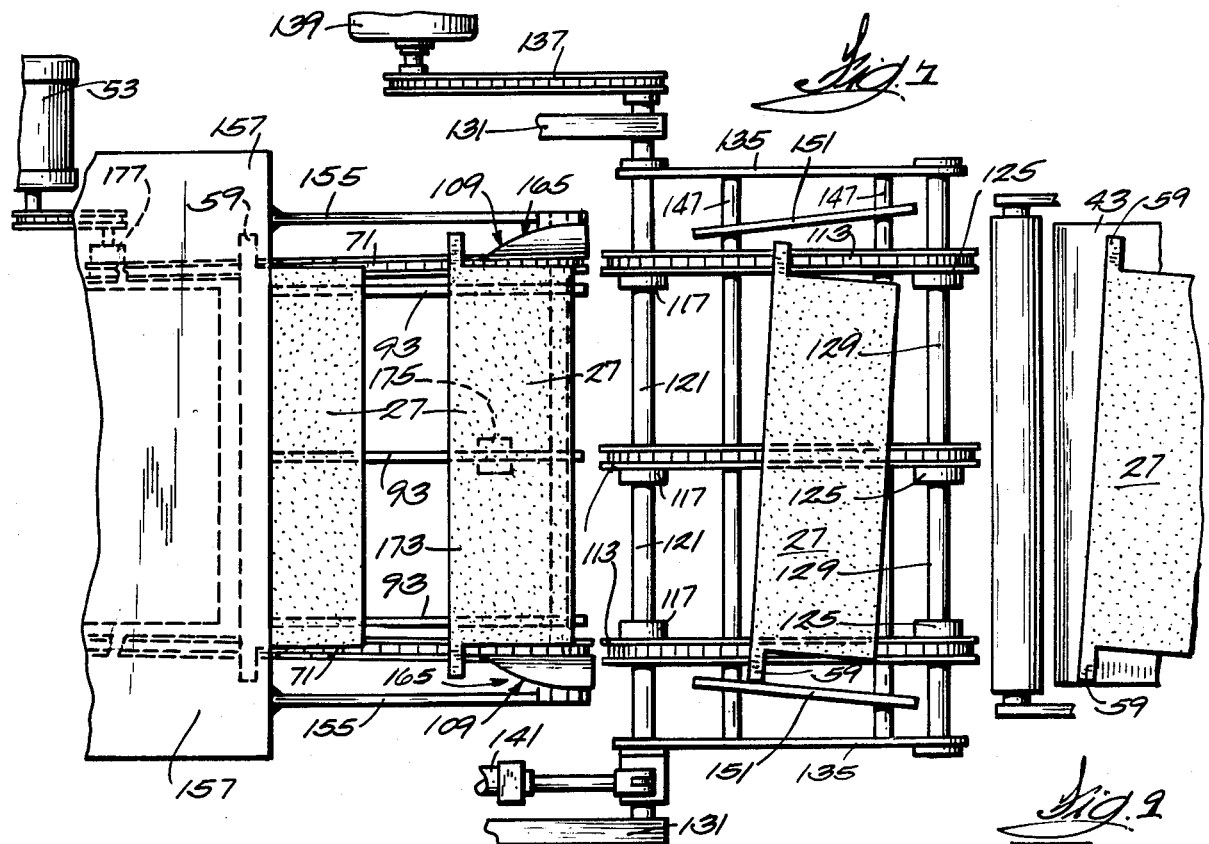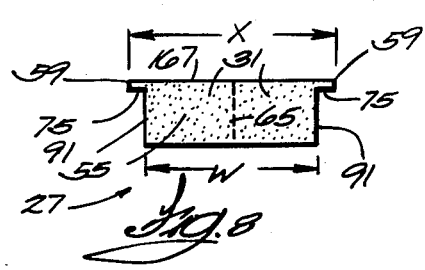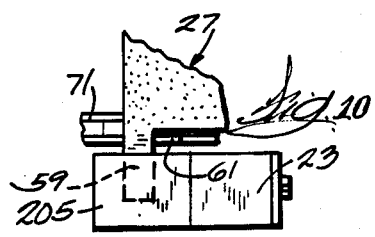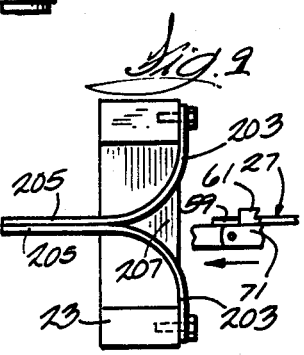

FLOW THROUGH APPARATUS FOR MANUFACTURING BATTERY PLATES

RELATED APPLICATION

This application is a continuation-in-part of application Ser. No. 606,232 filed May 2, 1984, now abandoned.

BACKGROUND OF THE INVENTION

The invention relates generally to the manufacture of battery plates used in storage batteries, such as, for example, automobile storage batteries.

The invention also relates to incorporation in an integrated manufacturing line of a previously generally known battery plate pasting machine, a previously generally known baking machine or oven, and a previously generally known battery plate parting or severing machine.

The invention also relates to transfer mechanisms for transferring objects, such as, for example, battery plate panels, from one conveyor to another and for insuring proper deposit of the object on the receiving conveyor and for preventing undesired engagement of the object with the receiving conveyor.

In addition, the invention also relates, incident to malfunction of the parting machine, to the problem of handling the partially or fully unbaked battery plates which are located in the oven at the time of the malfunction.

KNOWN PRIOR ART

The general construction of the pasting, baking and parting machines referred to herein is known in the art, and the general incorporation of these machines into an integrated manufacturing line has also been known in the past.

In addition, it is believed that at least one manufacturer of battery plates has employed arrangements for preventing undesired engagement of battery plate panels with the receiving end of a parting machine conveyor. However, it is believed that the technique disclosed herein have not been employed in the prior art.

Attention is directed to the KIRCHBERGER U.S. Pat. No. 3,990,388 issued Nov. 9, 1976.

SUMMARY OF THE INVENTION

The invention provides a mechanism for transferring battery plate panels between conveyors, which mechanism comprises a supply conveyor having a discharge end, a receiving conveyor having a receiving end located adjacent to and below the discharge end of the supply conveyor and including an endless member movable along a predetermined path and having thereon a battery plate drive lug adapted to engage a battery plate panel and thereby to cause transport of the battery plate panel along the receiving conveyor, and means for periodically advancing the endless member in the direction of conveyor advance, and through a predetermined distance greater than the length of a battery plate panel, means stationarily located adjacent the discharge end of the supply conveyor for guiding battery plate panel travel from the supply conveyor to the receiving conveyor, means for advancing the supply conveyor so as to deliver battery plate panels onto the guide means for delivery to the receiving conveyor, and means located in the area of battery plate receipt on the receiving conveyor and operably connected to the means for periodically advancing the endless member for sensing the receipt of a battery plate panel on the receiving conveyor and, in response to such receipt, for actuating the endless member advancing means to advance the endless member through the predetermined distance.

The invention also provides mechanism for manufacturing battery plates comprising a parting machine for severing pasted and baked battery plate panels into battery plates, an oven for baking pasted battery plate panels and including an oven conveyor for transporting pasted battery plate panels through the oven, a pasting machine for pasting battery plate panels and including a conveyor for transporting battery plate panels through the pasting machine and for delivering pasted battery plate panels to the oven conveyor, a transfer conveyor for receiving baked battery plate panels from the oven conveyor and for transferring baked battery plate panels to the parting machine, which transfer conveyor includes a portion movable between a transfer position affording such transfer of baked battery plate panels from the oven to the parting machine and a bypass position preventing transfer of baked battery plate panels from the oven to the parting machine, and means for displacing the transfer conveyor portion between the transfer and bypass positions, and control means operable, without interrupting advancement of the oven conveyor, for discontinuing advancement of the pasting machine conveyor so as to discontinue delivery therefrom of pasted battery plate panels to the oven, and for displacing the portion of the transfer conveyor to the bypass position, whereby in the event of malfunction of the parting machine, supply of pasted battery plate panels to the oven is discontinued while baking of pasted battery plate panels in the oven can be completed and the thereby baked battery plate panels delivered from the oven to a container located adjacent to the oven conveyor in position to receive pasted panels delivered therefrom.

The invention also includes a mechanism for transferring battery plate panels between conveyors, which mechanism comprises a supply conveyor having a discharge end, a receiving conveyor including a receiving end located adjacent to and below the discharge end of the supply conveyor, spaced and parallel endless members movable along a predetermined path and each having thereon in aligned relation a battery plate drive lug having a given height above the endless members and adapted to engage a battery plate panel and thereby to cause transport of the battery plate panel along the receiving conveyor in response to advancement thereof, which endless members each also have thereon a guide lug which is adapted to engage a battery plate panel side edge and which has a height above the endless member less than the height of the drive lugs, which receiving conveyor also includes fixed support means located between the endless members for support of the battery plate panels and, at the receiving end, being raised above the endless members and above the height of the guide lugs but below the height of the drive lugs so as to prevent engagement of the panels by the guide lugs while facilitating driving engagement of battery plate panels by the drive lugs, and means for advancing the endless members, means stationarily located adjacent the discharge end of the supply conveyor for guiding battery plate panel travel from the supply conveyor to the receiving conveyor, and means for advancing the supply conveyor so as to deliver battery plate panels onto the guide means for delivery to the receiving conveyor.

In one embodiment of the invention, the guide means comprises a pair of laterally spaced guide plates each having a guide edge extending from adjacent the discharge end of the supply conveyor to adjacent the receiving end of the receiving conveyor.

In one embodiment of the invention, the guide plates diverge upwardly and outwardly.

In one embodiment of the invention, the guide plates diverge outwardly from the receiving conveyor towards the supply conveyor.

Other features and advantages of the embodiments of the invention will become known by reference to the following general description, claims and appended drawings.

DESCRIPTION OF THE DRAWINGS

FIG. 1 is a partially broken away and schematic view of a battery plate manufacturing line.

FIG. 2 is an enlarged view of a portion of apparatus shown in FIG. 2.

FIG. 3 is an enlarged view, similiar to FIG. 2, showing various of the components of the apparatus shown in FIG. 2 in differing relation.

FIG. 4 is a view, with parts omitted, taken along line 4—4 of FIG. 2.

FIG. 5 is an enlarged top view, with parts omitted, of the guides shown in FIGS. 2, 3, and 4.

FIG. 6 is an enlarged, side elevational view of the transfer area of the battery plate manufacturing line shown in FIG. 1.

FIG. 7 is a top view of the area shown in FIG. 6.

FIG. 8 is a plan view of a panel or blank which is severed by the apparatus shown in FIG. 1, into two battery plates, and FIG. 9 is an enlarged fragmentary view of a portion of the machine shown at the left end of FIG. 1; and FIG. 10 is a partial plan view of the machine portion shown in FIG. 9.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown schematically in FIG. 1 is a battery plate manufacturing line 11 which includes, in series, a pasting machine 15, a baking machine or oven 19, and a parting or severing machine 23. The line 11 operates to apply material, known in the battery plate manufacturing industry as paste, to an open-grid battery plate panel or blank 27 shown in FIG. 8, to bake the pasted battery plate panel or blank 27 so as to unify the paste on the grid of the panel 27, and to otherwise complete fabrication and sever the pasted and baked panel or blank into two battery plates 31.

The pasting machine 15 is of known conventional construction, the details of which do not form a part of the present invention, except that the pasting machine 15 includes a conveyor 35 which individually transports a supply of the panels or blanks 27 through the pasting machine 15 and which can be selectively energized to advance or stop the conveyor. Any suitable motor or drive arrangement shown schematically at 39 can be employed to advance the conveyor 35.

The oven 19 is also of known conventional construction, and will not be described in detail except to note that the oven 19 includes a conveyor 43 which receives the pasted panels or blanks 27 from the pasting machine 15, and which transports the pasted panels or blanks 27 through the oven 19. At any one time, a plurality of panels or blanks 27, as for instance, as many as ten or twenty or more blanks or panels 27, will be located in the oven conveyor 43 for transportation through the oven 19 and consequent baking. It is also noted that while the baked blanks or panels 27 are located on the oven conveyor 43 in generally the same orientation, the panels or blanks 27 are often nevertheless somewhat skewed with respect to one other, i.e., their orientation in relation to one another is not precisely the same, and are often not properly located for transfer to the parting machine 23.

The parting machine 23 is, except as hereinafter noted, also generally of known conventional construction and, accordingly, various of the details of the parting machine 23 will not be discussed in detail. However, the parting machine 23 includes a conveyor 47 which transports baked and pasted battery plate panels or blanks 27 through a suitable mechanism or device, shown schematically at 51, for severing the panels or blanks 27 into two battery plates 31 and for trimming the lateral extent of the lugs 59. Any suitable cutting or severing device can be employed including, for instance, pairs of suitably arranged rotary cutters. In the disclosed construction, two pairs of rotary cutters are employed to trim the panel lugs 59 and one pair of rotary cutters are employed to sever the panels 27 into two battery plates 31. Except as noted hereinafter, any suitable drive arrangement shown schematically at 53 can be employed to advance the conveyor 47.

As shown in FIG. 8, the battery plate panel or blank 27 is generally rectangular in form including a rectangular main body or portion 55 and a pair of oppositely located and laterally outwardly extending projections or lugs 59, which projections or lugs 59 are engaged by the drive dogs or lugs 61 on the parting machine conveyor 47 so as to advance the panels or blanks through the parting machine 23. Because of the severing operation performed by the parting machine 23, at least a part of the parting machine conveyor 47 is preferably open from top to bottom.

The panel or blank 27 is severed into two battery plates 31 along the line 65 by the before-mentioned cutting device 51. In this regard, the panels or blanks 27 are preferably accurately located by the parting machine conveyor 47 for engagement by the cutting device 51 to sever the panels or blanks 27 into two battery plates 31.

More particularly, while other constructions can be employed, the parting machine conveyor 47 includes two laterally spaced endless chains 71, each of which includes, as before-mentioned, a series of upstanding drive dogs or lugs 61 for engaging the trailing edges 75 of the projections or lugs 59 on the battery plate panels or blanks 27 so as to transport the panels or blanks 27 through the parting machine 23. Each of the drive dogs or lugs 61 is preferably located, as shown in FIG. 4, adjacent the outside of the associated endless chain 77 and includes a leading, or panel-lug-engaging driving edge 79, and top and rearward non-driving edges 81. In addition, each of the endless chains 71 includes a series of upstanding guide dogs or lugs 85 which are located intermediate the drive lugs 61, which are also preferably located, as shown in FIG. 4, adjacent the outside of the associated endless chain 77, and which are adapted to engage the opposed sides of the main body 55 of the battery plate panel or blank 27 so as to guide the panel 27 into proper location relative to the cutting device 51. Also in this regard, the endless conveyor chains 71 are spaced apart in the area of receipt thereon of the battery plate panels or blanks 27 at a distance somewhat greater than the width "W" of the main body 55 of the panels or blanks 27 so as to facilitate receipt of the main body 55 of the blank 27 between the endless chains 71. In addition, the conveyor 47 converges slightly in the direction toward the cutting device 51 so as to engage the guide dogs or lugs 85 with the side edges 91 of the main body 55 of the panels or blanks 27 and thereby to effect proper positioning of the panels or blanks 27 relative to the cutting device 51.

In order to support the panels or blanks 27 as they are transported through the parting machine 23, the parting machine conveyor 47 includes, see FIG. 7, three fixed support rods 93 which extend in generally parallel relation to and between the endless conveyor chains 71, and which are laterally spaced from one another. Other constructions can be employed.

The machinery line 11 also includes a transfer device 101 which is located between the oven 19 and the parting machine 23 and which is operative, in one mode, to receive the baked panels or blanks 27 from the oven conveyor 43, to deliver such baked panels or blanks 27 to the parting machine conveyor 47, and to locate the panels or blanks 27 in position for delivery to the parting machine conveyor 47 in such manner as to assure proper engagement of the drive dogs or lugs 61 and the guide dogs or lugs 85 with the panels or blanks 27, and to prevent engagement of the panels or blanks 27 with the top or non-driving edges 81 of the drive lugs 61.

In a second mode of operation, the transfer device 101 is operative, in the event of malfunction of the parting machine 23 and consequent incapacity thereof to receive additional panels or blanks, to facilitate receipt, in a container 105 located below the transfer device 101, of a continuous stream of baked panels or blanks 27 from the oven conveyor 43. The container 105 can be of any construction suitable to permit receipt therein of the baked panels or blanks 27 discharged from the discharge end of the oven conveyor 43 when the transfer device 101 is not positioned to transfer battery plate panels 27 from the oven 15 to the parting machine 23.

More particularly, the transfer device 101 comprises a relatively short transfer conveyor 107 which is located (in one mode of operation) to receive the panels or blanks 27 from the oven conveyor 43 and to deliver the panels or blanks 27 through a pair of guide plates 109 to the receiving end of the parting machine conveyor 47, which receiving end is located adjacent to and below the adjacent end of the transfer conveyor 107.

Still more particularly, while other constructions can be employed, the transfer conveyor 107 includes three endless chains 113 which are trained around drive sprockets 117 mounted on a common drive shaft 121 and around idler sprockets 125 which are also carried on a common idler shaft 129. The drive shaft 128 is supported or journaled in a frame portion 131 extending from the parting machine 23. In addition, the drive and idler shafts 121 and 129 are journaled in a suitable transfer conveyor frame 135 which is pivoted about the axis of the drive shaft 121 between a transfer position shown in full lines in FIG. 6, and a pivotally elevated or bypass position shown in dotted lines in FIG. 6. The drive shaft 121 is rotated at a predetermined speed by a suitable drive train 137 driven by an electric motor 139. Any other suitable drive can be employed.

Any suitable means can be employed for displacing the transfer conveyor 107 from the transfer position to the bypass position. In the disclosed construction, such means comprises a pneumatic cylinder 141 connected between the pivotal transfer conveyor frame 135 and, see FIG. 6, a stationary frame portion 143 of the parting machine 23.

Supported on two cross bars 147 mounted on the pivotal transfer conveyor frame 135 are a pair of adjustably located and laterally spaced guide bars 151 which provide initial alignment to the plates or blanks 27 as they travel along the transfer conveyor 107 and which are located to insure registration and engagement of the battery plate panel lugs 59 with the guide plates 109 previously mentioned.

Also forming a part of the transfer device 101 are the previously mentioned guide plates 109 which are fixedly located in laterally spaced relation to each other and at a distance greater than the width "W" of the battery plate panel main body 55, but less than the width "X" measured between the laterally outer ends of the lugs or projections 59. The guide plates 109 are located at the discharge end of the transfer conveyor 107 and suitably supported, at their lower ends, by a subframe 155 extending fixedly from a frame portion 157 of the parting machine 23. While other constructions can be employed, the guide plates 109 are each generally of three sided shape including a lower generally horizontal edge 161 located, as shown best in FIG. 4, in generally co-planar relation with and adjacently above the path of travel of the drive lugs 61, a generally vertical edge 163 which is of lesser length than the horizontal edge 161 and which is located adjacent to the discharge end of the transfer conveyor 107, and an outwardly convexly arcuately formed upper or guide edge 165 along which the projections or lugs 59 of the panels or blanks 27 travel during transfer between the transfer conveyor 107 and the parting machine 23.

The guide plates 109 are also formed, see FIGS. 4 and 5, so as to slightly arcuately diverge outwardly and upwardly from the lower edge 161 and so as to slightly arcuately diverge outwardly in the direction from the parting machine 23 toward the transfer conveyor 107. Accordingly, as the panels or blanks 27 transit the guide plates 109 between the transfer conveyor 107 and the parting machine conveyor 47, the lugs 59 ride along the upper convex guide edges 165 and the main body 55 of the plates or blanks 27 travel between the guide plates 109 and are consequently aligned so that the leading panel edge 167 arrives at the parting machine conveyor 47 in perpendicular relation to the direction of advance of the parting machine conveyor 47 and so that the panel 27 is delivered to the parting machine conveyor 47 with the panel main body 55 lying flat on the conveyor 47.

Means are provided for sensing the arrival of a battery plate panel 27 in a transfer or receiving area 173 (see FIG. 7) on the parting machine conveyor 47 and for advancing the parting machine conveyor 47 for a distance which is greater than the extent of the battery plate 27 in the direction of conveyor travel, so as thereby to condition the conveyor 47 for receipt, in the transfer area 173, of the next battery plate panel 27. While other constructions can be employed, in the disclosed construction, such means for sensing a newly arrived battery plate panel and for advancing the parting machine conveyor 47 includes a sensor 175 located underneath the upper run of the parting machine conveyor 47 in the transfer area 173 in which the battery plate panels 27 are deposited and the employment in the conveyor drive arrangement 53 of a schematically illustrated single revolution clutch and brake 177 which can be of conventional construction and which is operable to advance the conveyor 47 a distance equal to the distance between the drive lugs 61.

More particularly, incident to the arrival on the parting machine conveyor 47 of a battery plate panel 27, the sensor 175 emits a signal which is effective to "trip" or actuate the single revolution clutch and brake 177 so as to obtain the desired advance which, in one embodiment is 9 inches. Any suitable means known in the art can be employed for connecting the sensor 175 to the one revolution clutch and brake 177 so as to obtain such actuation.

Various sensors 175 can be employed. For instance, a conventional proximity switch or a mechanical switch with a flexible feeler or actuator could be used.

It is noted that, at the end of each advance, the just delivered battery plate 27 has been removed from the transfer area 173 and the next drive lug 61 is adjacently upstream from the delivery end of the guide plates 109 so as not to interfere with the deposit of the next battery plate 27 in the transfer area 173.

The conveyor advancing arrangement prevents engagement, during battery plate panel deposit on the parting machine conveyor 47, of the lugs or projections 59 on the panels or blanks 27 with the drive dogs or lugs 61 on the endless conveyor chains 71 of the parting machine conveyor 47. During such deposit, such engagement can interfere with proper driving engagement between the trailing edges 75 of the lugs 59 on the panels 27 and the driving edges 79 of the driving dogs 61 on the parting machine conveyor 47.

In order to prevent engagement of the guide dogs 85 in driving engagement with the battery plate panel lugs or projections 59, the support rods 93 are bowed upwardly, see FIGS. 2 and 3, in the region of the receiving end or transfer area 173 of the parting machine conveyor 47 so that the upper edges 181 of the guide dogs 85 are located below a panel or blank 27 lying flat on the support rods 93. However, the height of the drive lugs 61 is sufficiently greater than the height of the guide dogs 85 so as to insure engagement of the drive lugs 61 with the rear or trailing edges 75 of the panel lugs 59 when the panels 27 are supported at the top of the bowed portion of the support rods 93. If desired, in the area of the receiving end of the parting machine conveyor, support rods 93 can be mounted above the conveyor as indicated and extend along the conveyor with the upper surfaces of the rods parallel with the upper surface of the chains 71 and with the support rods unbowed.

Means are also provided, in the event of a malfunction of the parting machine 23 and the consequent undesirability of receiving additional baked panels 27 on the parting machine conveyor 47, to facilitate completion of the baking of the panels 27 on the oven conveyor 43, to collect the baked panels 27 discharged from the oven conveyor 43 without transferring such discharged panels 27 to the parting machine conveyor 47, and for discontinuing operation of a pasting machine 15 so as to stop the supply of pasted panels 27 to the oven 19.

While various other arrangements, including automatic arrangements, are possible, in the illustrated construction, such means comprises an operator controlled electric control switch 201 which, when activated, energizes the pneumatic cylinder 141 to pivotally raise the transfer conveyor 107 to the bypass position, and simultaneously de-energizes the pasting machine 15 including the pasting machine drive motor 39, and which can also optionally be electrically coupled to the drive 53 to de-energize the parting machine conveyor 47. However, such actuation of the control switch 201 does not discontinue advancement of the oven conveyor 43 or oven operation, thereby permitting completion of the baking of the plates 27 already transferred from the pasting machine 15 to the oven. In addition, the location of the transfer conveyor 107 in the bypass position also facilitates discharge of the baked panels 27 from the oven conveyor 43 into the container 105.

Further actuation of the control switch 201 serves to again enable energizing of the pasting machine conveyor 35, (and parting machine conveyor 47 if de-energized) and to cause actuation of the cylinder 141 to pivotally lower the transfer conveyor 107 of the transfer position.

Means are also provided, as shown to the left in FIG. 1 and especially in FIGS. 9 and 10, for maintaining engagement of the drive lugs 61 with the lugs 59 of the battery plate panels 27 during travel of the panels 27 through the cutting device 51. While various constructions can be employed, in the disclosed construction, such means comprises, on each side of the parting machine conveyor 47, and in outwardly adjacent relation to the associated endless members 71, and in closely adjacent advance of the cutting device 51, a pair of resilient strips 203 suitably fixedly supported above and below the endless chains 71 by the frame of the parting machine 23. In each pair, the restraining strips 203 extend toward each other, and have a length considerably in excess of the vertical distance between the supports. As a result, and in the absence of the passage therebetween of a battery plate panel lug 59, the unsupported end portions 205 of the strips 203 extend in engagement with each other in the direction of conveyor travel and, between the end portions 205 and the supports, the strips 203 are bowed or curved toward each other to define an entry throat 207. The restraining strips 203 are located, with respect to parting machine conveyor advance, such that the panel lugs 59 are located between the strips during at least a part of the severing operation.

While the strips can be fabricated of various materials, in the illustrated construction, the strips are fabricated of brass.

Similiar pairs of restraining strips 213 can be employed in downstream, closely adjacent relation to the severing or cutting device 51.

In operation with respect to the restraining strips, advancement of the parting machine conveyor 47 causes the drive lugs 61 to propel the panel lugs 59 into the throat 207 between the restraining strips in each pair and then between the otherwise engaged free end portions 205 of the restraining strips. Such panel movement between the restraining strips serves to prevent or restrain advancement of the panels 27 ahead of the drive lugs 61, as for instance, in response to each initiation of periodic advancement of the parting machine conveyor 47. In other words, the restraining strips serve to restrain advance movements of the panels 27 ahead of the drive lugs 61 and thus serve, at least in the area of the cutting device 51, to maintain engagement between the drive lugs 61 and the panels 27.

Various of the features of the invention are set forth in the following claims.

I claim:

1. A mechanism for transferring battery plate panels between conveyors, said mechanism comprising a supply conveyor having a discharge end, a receiving conveyor having a receiving end located adjacent to and below said discharge end of said supply conveyor and including an endless member movable along a predetermined path and having thereon a battery plate drive lug adapted to engage a battery plate panel and thereby to cause transport of the battery plate panel along said receiving conveyor, and means for periodically advancing said endless member in the direction of conveyor advance and through a predetermined distance greater than the length of a battery plate panel, means stationarily located adjacent said discharge end of said supply conveyor for guiding battery plate panel travel from said supply conveyor to said receiving conveyor, means for advancing said supply conveyor so as to deliver battery plate panels onto said guide means for delivery to said receiving conveyor, and means located in the area of battery plate receipt on said receiving conveyor, and operably connected to said means for periodically advancing said endless member, for sensing the receipt of a battery plate panel on said receiving conveyor and, in response to said receipt, for actuating said endless member advancing means to advance said endless member through said predetermined distance.

2. A mechanism in accordance with claim 1 wherein said guide means comprises a pair of laterally spaced guide plates each having a guide edge extending from adjacent said discharge end of said supply conveyor to adjacent said receiving end of said receiving conveyor.

3. A mechanism in accordance with claim 2 wherein said guide plates diverge upwardly and outwardly.

4. A mechanism in accordance with claim 2 wherein said guide plates diverge outwardly from said receiving conveyor towards said supply conveyor.

5. A mechanism in accordance with claim 1 wherein said sensing means comprises a proximity switch located adjacent the area in which the battery plate panels are delivered to said receiving conveyor.

6. A mechanism for transferring battery plate panels between conveyors, said mechanism comprising a supply conveyor having a discharge end, a receiving conveyor having a receiving end located adjacent to and below said discharge end of said supply conveyor and including an endless member movable along a predetermined path and having thereon a battery plate drive lug adapted to engage a battery plate panel and thereby to cause transport of the battery plate panel along said receiving conveyor in response to advancement of said endless member, and means for advancing said endless member including a single revolution clutch operable, upon actuation thereof, to advance said endless member in the direction of endless member advance and through a predetermined distance greater than the length of a battery plate panel, means stationarily located adjacent said discharge end of said supply conveyor for guiding battery plate panel travel from said supply conveyor to said receiving conveyor, means for advancing said supply conveyor so as to deliver battery plate panels onto said guide means for delivery to said receiving conveyor, and means located in the area of battery plate receipt on said receiving conveyor, and operably connected to said single revolution clutch, for sensing the receipt of a battery plate panel on said receiving conveyor and for actuating said single revolution clutch to advance said endless member through said predetermined distance.

7. A mechanism for transferring battery plate panels between conveyors, said mechanism comprising a supply conveyor having a discharge end, a receiving conveyor including a receiving end located adjacent to and below said discharge end of said supply conveyor, spaced and parallel endless members movable along a predetermined path and each having thereon in aligned relation a battery plate drive lug having a given height above said endless members and adapted to engage a battery plate panel and thereby to cause transport of the battery plate panel along said receiving conveyor in response to advancement thereof, said endless members each also having thereon a guide lug which is adapted to engage a battery plate panel side edge and which has a height above said endless member less than said height of said drive lugs, said receiving conveyor also including fixed support means located between said endless members for support of the battery plate panels and, at said receiving end, being raised above said endless members and above said height of said guide lugs but below said height of said drive lugs so as to prevent engagement of the panels by said guide lugs while facilitating driving engagement of battery plate panels by said drive lugs, and means for advancing said endless members, means stationarily located adjacent said discharge end of said supply conveyor for guiding battery plate panel travel from said supply conveyor to said receiving conveyor, and means for advancing said supply conveyor so as to deliver battery plate panels onto said guide means for delivery to said receiving conveyor.

8. Apparatus for manufacturing battery plates comprising a parting machine for severing pasted and baked battery plate panels into battery plates, an oven for baking pasted battery plate panels and including an oven conveyor for transporting pasted battery plate panels through said oven, a pasting machine for pasting battery plate panels and including a conveyor for transporting battery plate panels through said pasting machine and for delivering pasted battery plate panels to said oven conveyor, a transfer conveyor for receiving baked battery plate panels from said oven conveyor and for transferring baked battery plate panels to said parting machine, said transfer conveyor including a portion movable between a transfer position affording such transfer of baked battery plate panels from said oven to said parting machine and a bypass position preventing transfer of baked battery plate panels from said oven to said parting machine, and means for displacing said transfer conveyor portion between said transfer and bypass positions, and control means operable, without interrupting advancement of said oven conveyor, for discontinuing advancement of said pasting machine conveyor so as to discontinue delivery therefrom of pasted battery plate panels to said oven, and for displacing said portion of said transfer conveyor to said bypass position, whereby in the event of malfunction of said parting machine, supply of pasted battery plate panels to said oven is discontinued while baking of pasted battery plate panels in said oven can be completed and the thereby baked battery plate panels delivered from said oven to a container located adjacent to said oven conveyor in position to receive pasted panels delivered therefrom.

9. Apparatus in accordance with claim 8 including a container located adjacent to said oven and said transfer conveyor for receiving and holding baked battery plate panels delivered from said oven conveyor when said portion of said transfer conveyor is in said bypass position.

10. Apparatus in accordance with claim 8 wherein said pasting machine conveyor is electrically driven, wherein said transfer conveyor portion displacing means comprises a fluid cylinder, and wherein said control means comprises an electrical control switch operable to electrically de-energize said pasting machine conveyor and to electrically cause actuation of said fluid cylinder.

11. Apparatus for manufacturing battery plates, said apparatus comprising a parting machine for severing pasted and baked battery plate panels into battery plates and including a conveyor having a receiving end, an endless member movable along a predetermined path and having thereon a battery plate drive lug including a driving edge adapted to engage a battery plate panel and thereby to cause transport of the battery plate panel along said parting machine conveyor, said drive lug also including a non-driving edge, and means for periodically advancing said endless member of said parting machine conveyor through a predetermined distance greater than the length of a battery plate panel in the direction of parting machine conveyor advance, and an oven for baking pasted battery plate panels and including an oven conveyor for transporting pasted battery plate panels through said oven, a pasting machine for pasting battery plate panels and including a conveyor for transporting battery plate panels through said pasting machine and for delivering pasted battery plate panels to said oven conveyor, a transfer device for receiving baked battery plate panels from said oven conveyor and for transferring the baked battery plate panels to said parting machine, said transfer device comprising a transfer conveyor having a discharge end located adjacent to and above said receiving end of said parting machine conveyor, and a portion movable between a transfer position affording transfer of baked battery plate panels from said oven to said parting machine and a bypass position preventing transfer of baked battery plate panels from said oven to said parting machine, means for displacing said transfer conveyor portion between said transfer and bypass positions, means stationarily located adjacent said discharge end of said transfer conveyor for guiding battery plate panel travel from said supply conveyor to said parting maching conveyor, and means for advancing said transfer conveyor so as to deliver a battery plate to said guide means for delivery to said parting machine conveyor, and means located in the area of battery plate receipt on said parting machine conveyor, and operably connected to said means for periodically advancing said endless member for sensing the receipt of a battery plate panel on said parting machine conveyor and, in response to said receipt, for actuating said endless member advancing means to advance said endless member through said predetermined distance, a container located adjacent said oven and said transfer device for receiving and holding baked battery plate panels delivered from said oven conveyor when said transfer conveyor portion is in said bypass position, and control means operable, without interrupting advancement of said oven conveyor, for discontinuing advancement of said pasting machine conveyor so as to discontinue delivery therefrom of pasted battery plate panels to said oven, and for displacing said portion of said transfer conveyor to said bypass position, whereby in the event of malfunction of said parting machine, supply of pasted battery plate panels to said oven is discontinued while baking of pasted battery plate panels in said oven can be completed and the thereby baked battery plate panels delivered from said oven to said container.

* * * * *